H. M. CHANEY.
TIRE RIM.
APPLICATION FILED OCT. 11, 1915. RENEWED SEPT. 21, 1916.
1,205,161.
Patented Nov. 21, 1916.
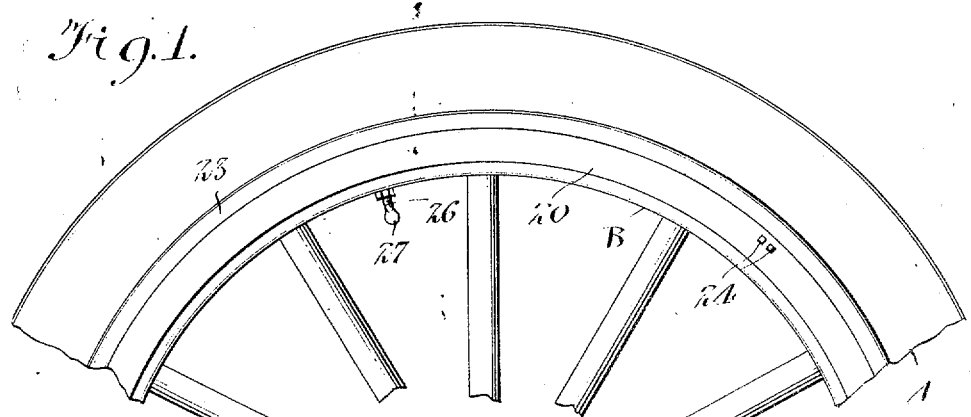
Fig. 1.
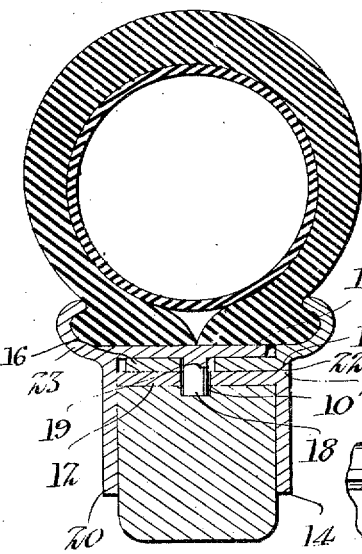
Fig. 2.
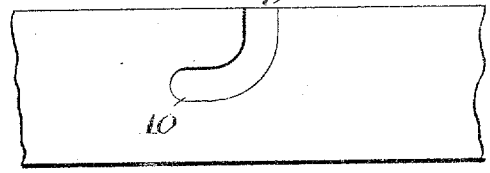
Fig. 3.
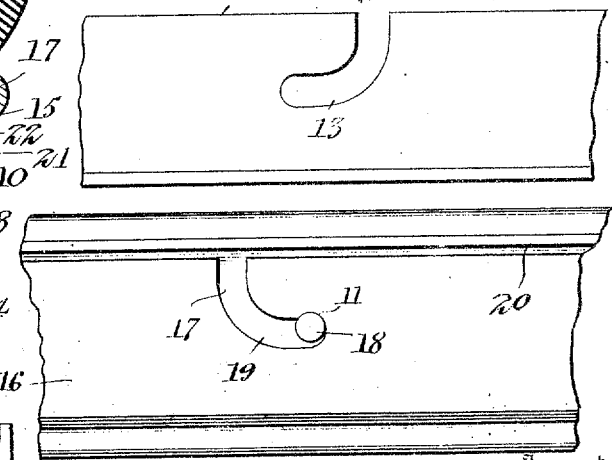
Fig. 4.
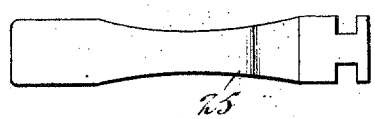
Fig. 6.
Fig. 5.
Inventor
Herbert M. Chaney
By Victor J. Evans
Attorney
Witnesses

UNITED STATES PATENT OFFICE.

HERBERT M. CHANEY, OF SARDINIA, OHIO.

TIRE-RIM.

1,205,161.   Specification of Letters Patent.   Patented Nov. 21, 1916.

Application filed October 11, 1915, Serial No. 55,263.   Renewed September 21, 1916.   Serial No. 121,521.

*To all whom it may concern:*

Be it known that I, HERBERT M. CHANEY, a citizen of the United States, residing at Sardinia, in the county of Brown and State of Ohio, have invented new and useful Improvements in Tire-Rims, of which the following is a specification.

The invention relates to a tire rim, and more particularly to the class of separable and quickly demountable tire rims.

The primary object of the invention is the provision of a rim of this character wherein the sections thereof can be securely fastened together and also secured to the felly of the wheel without the necessity of the use of independent fasteners for this particular purpose.

Another object of the invention is the provision of a rim of this character wherein the same can be readily and conveniently detached from the felly and likewise, the tire rim from the wheel, with despatch.

A further object of the invention is the provision of a rim of this character, wherein the same is firmly locked upon the felly so as to avoid the possibility of the creeping thereof during the travel of the wheel in the accidental separation of the sections of the rim while the wheel is in use.

A still further object of the invention is the provision of a rim of this character and which is simple in construction, thoroughly reliable and efficient in purpose, strong, durable, and inexpensive to manufacture.

With these and other objects in view, the invention consists in the features of construction, combination and arrangement of parts as will be hereinafter fully described, illustrated in the accompanying drawing, and pointed out in the claim hereunto appended.

In the accompanying drawing; Figure 1 is a fragmentary side elevation of a wheel showing the rim constructed in accordance with the invention, applied thereto. Fig. 2 is an enlarged vertical transverse sectional view. Fig. 3 is a fragmentary plan view of the felly. Fig. 4 is a similar view of the inner annulus of the rim. Fig. 5 is a similar view of the outer annulus of the rim looking toward the inner side thereof. Fig. 6 is a plan view of a span or key.

Similar reference characters indicate corresponding parts throughout the several views in the drawing.

Referring to the drawing in detail, A designates a portion of a wheel and B the felly which has formed therein at intervals in its outer periphery curvilinear slots 10, each having its outer end opening through one side of the felly B, and concentrically disposed about the felly B is an annulus 12 preferably made from metal, the same being formed with companion slots 13 correspondingly shaped to and adapted to register with the slots in the felly. On one side edge of the annulus 12 is a cheek ring 14 which overlaps one side of the felly and forms at its outer periphery an inwardly beveled abutment flange 15 which protrudes beyond the outer face of the annulus 12 circumferentially thereof for a purpose presently described.

Encircling the annulus 12 is the separable and quickly demountable rim which, as a part thereof, includes the annulus 12 and comprises the inner and outer hoop-like or annular sections 16 and 17 respectively, the inner section being adapted to telescope within the outer section, which is formed at intervals with internal lugs 18 protruding from the inner surface thereof, while the inner section 16 is formed with slots 19 correspondingly shaped to and adapted to register with the slots 10 and 13 in the respective felly and annulus 12 and these slots when in registration with each other are adapted to receive the lugs 18 so that on the twisting of the outer section 17 the lugs 18 will move inwardly in the slots for locking engagement in the inner terminal notches 11 thereof for firmly securing the separable and quickly demountable rim upon the felly and also the securing of the inner and outer sections 16 and 17 together, as will be clearly apparent. Each slot 19 at its inner end is formed with an offset notch 11 to receive the lug 18 so that the annular sections 16 and 17 will be locked to each other to prevent relative turning thereof when a tire is carried upon the demountable rim and is inflated.

The outer section 17 on the side edge thereof remote from the flange 15 on the annulus 12 is formed with a cheek ring 20 which overlaps the opposite side of the felly B, while the inner section 16 is formed on its side edge next to the flange 15 with an annular flange 21 having a beveled face 22 which coöperates with the beveled flange 15 so that the said flange 21 at its outer side will be flush with the outer face of the cheek ring 14 when the rim is upon the wheel.

The cheek ring 20 at its outer periphery projects beyond the outer surface of the outer section 17 to provide a flange 23 which coöperates with the flange 21 on the inner section 16 for holding a tire on the demountable rim as shown. These flanges 21 and 23 prevent the lateral displacement of the tire when supported upon the separable rim, yet the said tire can be readily detached from the rim on separating the inner and outer sections 16 and 17 thereof. If desired, the tire need not be removed from the rim and the latter can be readily and quickly detached from the wheel, as will be apparent.

Provided at diametrically opposite points and mounted in the outer face of the cheek ring 20 are a pair of spaced lugs 24 for accommodating a span or key 25 so that the outer section 17 can be readily turned for detaching the same from the inner section 16 or demounting thereof on the said inner section and likewise for the mounting of the rim upon the wheel.

Tapped in the felly B from the inner periphery thereof is a locking stem 26, the inner end of which is adapted to work through the outer periphery of the felly B for engagement in the slots when in the respective annulus 12, inner and outer sections 16 and 17 when the said slots are in registration with each other, thereby locking the sections of the rim together and the latter upon the felly to avoid any possibility of the creeping of the rim upon the felly, and likewise, the creeping of the annulus 12 thereon, the said stem 26 at its outer end being formed with a finger wing 27 which permits the convenient turning thereof for releasing the rim or the fastening of the same on the felly.

From the foregoing, it is thought that the construction and manner of operation of the separable and quickly demountable rim will be clearly understood, and therefore, a more extended operation has been omitted.

What is claimed is:

In a wheel, a felly having curvilinear slots in its outer periphery and opening through one side thereof, of a pair of annuli arranged concentrically with respect to each other and also with respect to the felly, all of the annuli with the exception of the outermost one being formed with curvilinear slots correspondingly shaped to and registering with the slots in the felly, and lugs formed on the outermost annulus and detachably engageable in said slots, the innermost annulus being formed with notches at the innermost ends of said slots therein to receive the lugs for the locking of the same in the slots, and clencher tire-engaging flanges on two of the outermost annuli for the securing of the tire in place.

In testimony whereof I affix my signature in presence of two witnesses.

HERBERT M. CHANEY.

Witnesses:
E. H. RAINEY,
A. S. GODFREY.